United States Patent [19]

Baker et al.

[11] Patent Number: 4,908,618
[45] Date of Patent: Mar. 13, 1990

[54] ABNORMAL START ADVISORY SYSTEM (ASAS) FOR AIRCRAFT ENGINES

[75] Inventors: Thomas M. Baker, Renton; Michael T. Dunn, Federal Way; Jeffrey E. Duven; Jim W. Hackler, both of Renton; Peter J. Louden, Mercer Island; Clifford M. Schjoneman, Issaquah, all of Wash.

[73] Assignee: The Boeing Company, Seattle, Wash.

[21] Appl. No.: 290,591

[22] Filed: Dec. 27, 1988

[51] Int. Cl.$^4$ ............................................. G08B 21/00
[52] U.S. Cl. .............................. 340/945; 364/431.01; 73/117.3
[58] Field of Search ............... 340/945, 439, 514, 517; 364/431.01, 431.07, 431.1, 424.01, 424.06; 123/198 D; 73/117.3

[56] References Cited

U.S. PATENT DOCUMENTS

| | | | |
|---|---|---|---|
| 3,721,120 | 3/1973 | Howell et al. | 73/117.3 |
| 3,906,437 | 9/1975 | Brandwein et al. | 340/945 |
| 4,454,754 | 6/1984 | Zagranski et al. | 340/439 |
| 4,785,403 | 11/1988 | Kuhlberg | 364/424.06 |
| 4,787,053 | 11/1988 | Moore | 340/945 |
| 4,821,216 | 4/1989 | Howell et al. | 340/945 |

*Primary Examiner*—Joseph A. Orsino
*Assistant Examiner*—Brent A. Swarthout
*Attorney, Agent, or Firm*—Conrad O. Gardner; B. A. Donahue

[57] ABSTRACT

Flight deck information warning system for notifying the flight crew of abnormal engine operating conditions in the sub-idle region. The warning system is responsive to signals representative of engine exhaust temperature, engine core rotor speed, total air temperature, engine fuel flow and, airframe calibrated airspeed.

1 Claim, 4 Drawing Sheets

ABNORMAL START ADVISORY SYSTEM (ASAS) FOR AIRCRAFT ENGINES

BACKGROUND OF THE INVENTION

This invention relates to an aircraft flight deck information system, and more particularly, to an abnormal start advisory system (ASAS) for aircraft engines.

SUMMARY OF THE INVENTION

Heretofore, gas turbine engine monitoring systems have provided a warning to an operator in the event of abnormal conditions or provided automatic shutdown when certain conditions existed. U.S. Pat. No. 4,454,754 to Zagranski et al. discloses an alarm system which utilizes core rotor speed and acceleration in the control algorithm. Engine exhaust temperature (EGT) and fuel flow rate has been utilized in prior art systems.

In contrast, the preferred embodiment of the present invention provides a warning system in the "sub-idle" region utilizing airspeed and a sliding EGT limit which is dependent on corrected core rotor speed.

Accordingly, it is an object of the present invention to provide a flight crew warning system responsive to engine conditions in the sub-idle region which are considered abnormal.

It is a further object of the present invention to provide an abnormal start advisory system responsive to signals representative of airspeed and sliding EGT limit.

These and other objects, features, and advantages of the present invention will become more clearly apparent upon a reading of the following detailed description taken in conjunction with the appended drawings wherein:

DESCRIPTION OF THE PREFERRED EMBODIMENTS

Figure 1A:
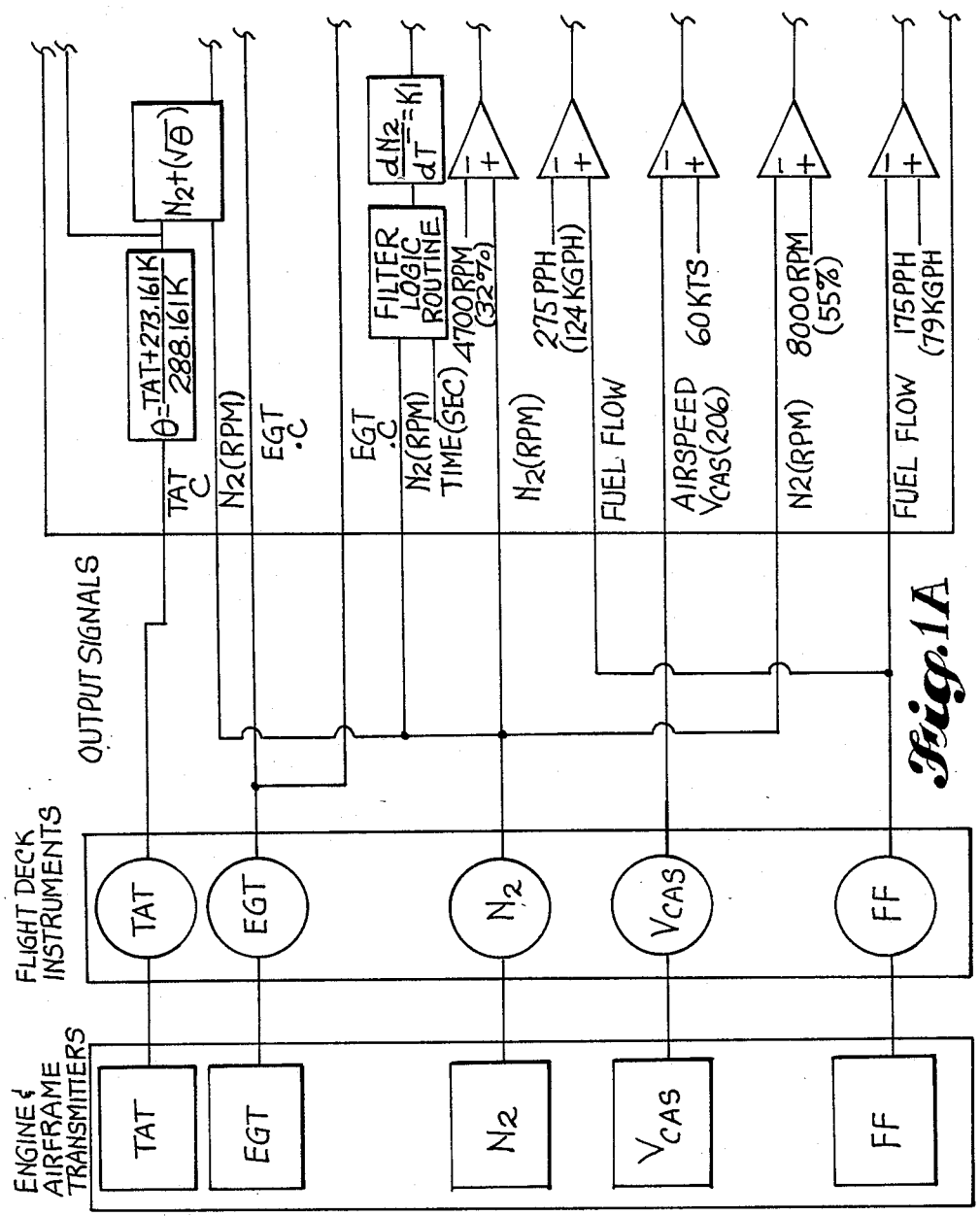
FIGS. 1A and 1B positioned side-by-side and taken together is illustrative of signal processing from engine airframe sensors for providing flight crew warning of undesired engine operation in the sub-idle region.
Figure 1B:
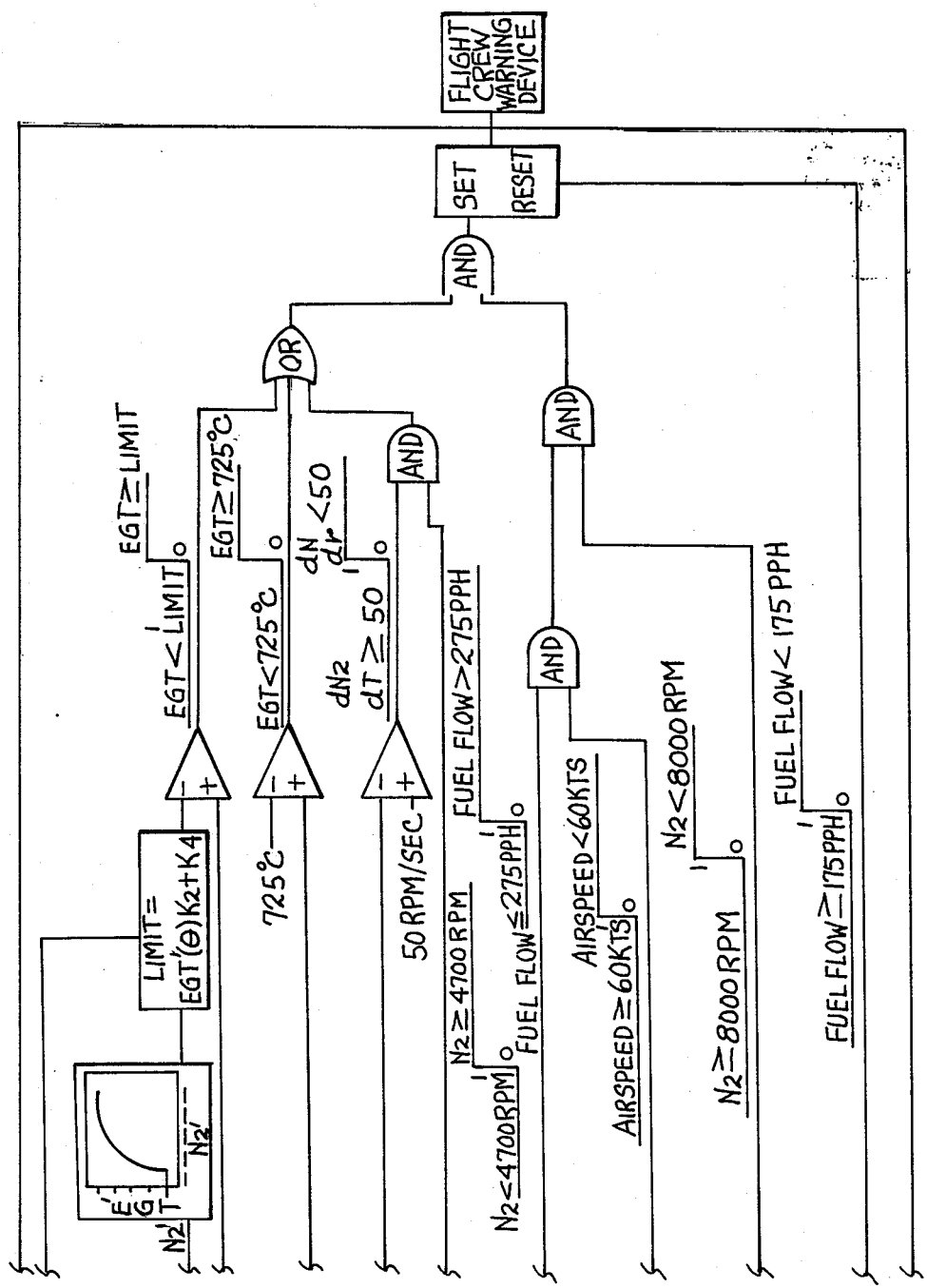

Turning now to FIG. 1 it can be seen that engine airframe sensors 10 transmit signals which are monitored and displayed on flight deck instruments 20. Through signal processing of the respective output signals 30 downstream as hereinafter described, an output warning either visual or audible is provided to the flight crew by warning device 100 (see FIG. 1B). The present warning system shown in FIGS. 1A and 1B notifies the aircraft flight crew of engine conditions in the sub-idle region which are considered abnormal. These conditions occur primarily during engine start but may be experienced in other phases of aircraft ground operation and if undetected may result in internal engine damage.

Gas turbine aircraft engines can be subject to Low Pressure Turbine (LPT) overtemperature damage during periods of sub-idle operation. Deviations from recommended engine operation procedures, engine system malfunctions, or airframe system malfunctions can induce abnormal engine conditions in the sub-idle region which if undetected could contribute to LPT overtemperature damage. These deviations or malfunctions can result in an engine stall during starting, a rollback from idle, or a sub-idle engine exhaust gas temperature (EGT) exceedance.

Engine and airframe parameters monitored by the present system in the sub-idle region to detect abnormal engine conditions include:
Engine Exhaust Gas Temperature (EGT) 12
Engine core rotor speed (N2) 14
Total Air Temperature (TAT) 16
Engine Fuel Flow (FF) 18
Airframe calibrated airspeed (Vcas) 22

The ability to detect and inform the flight crew of such abnormal engine conditions provides significant financial and operational benefits to aircraft operators. The present ASAS system through downstream signal processing provides the alarm at 100 which information is not immediately available from standard flight deck instruments 20.

Prior art aircraft have been equipped with passive stall warning systems that provide visual indication to the flight crew of an engine stall. Such systems are incapable of detecting EGT exceedances and hence are limited in function and benefit.

Also, commercial prior art aircraft have utilized engine control systems capable of detecting engine stalls or EGT exceedances in the sub-idle region and upon detection the engine is automatically shut down. Such active control systems are unsuitable for use in aircraft requiring the present system hereinafter described.

Returning to FIG. 1, there is shown the specific parameter thresholds necessary to detect abnormal engine conditions in the present warning system.

A sub-idle abnormal engine condition exists when all of conditions (d) through (f) below are simultaneously satisfied with one or more of conditions (a) through (c):
  (a) Engine EGT ≧ Sliding EGT function limit.
  (b) Engine EGT ≧ 725° C.
  (c) Engine core rotor acceleration (dN2/dt) < 50 RPM/SEC and N2 ≧ 4700 RPM.
  (d) Engine fuel flow > 275 LBS/HR.
  (e) Airframe calibrated airspeed < 60 Knots.
  (f) Engine core rotor speed < 8000 RPM.

Figure 2:
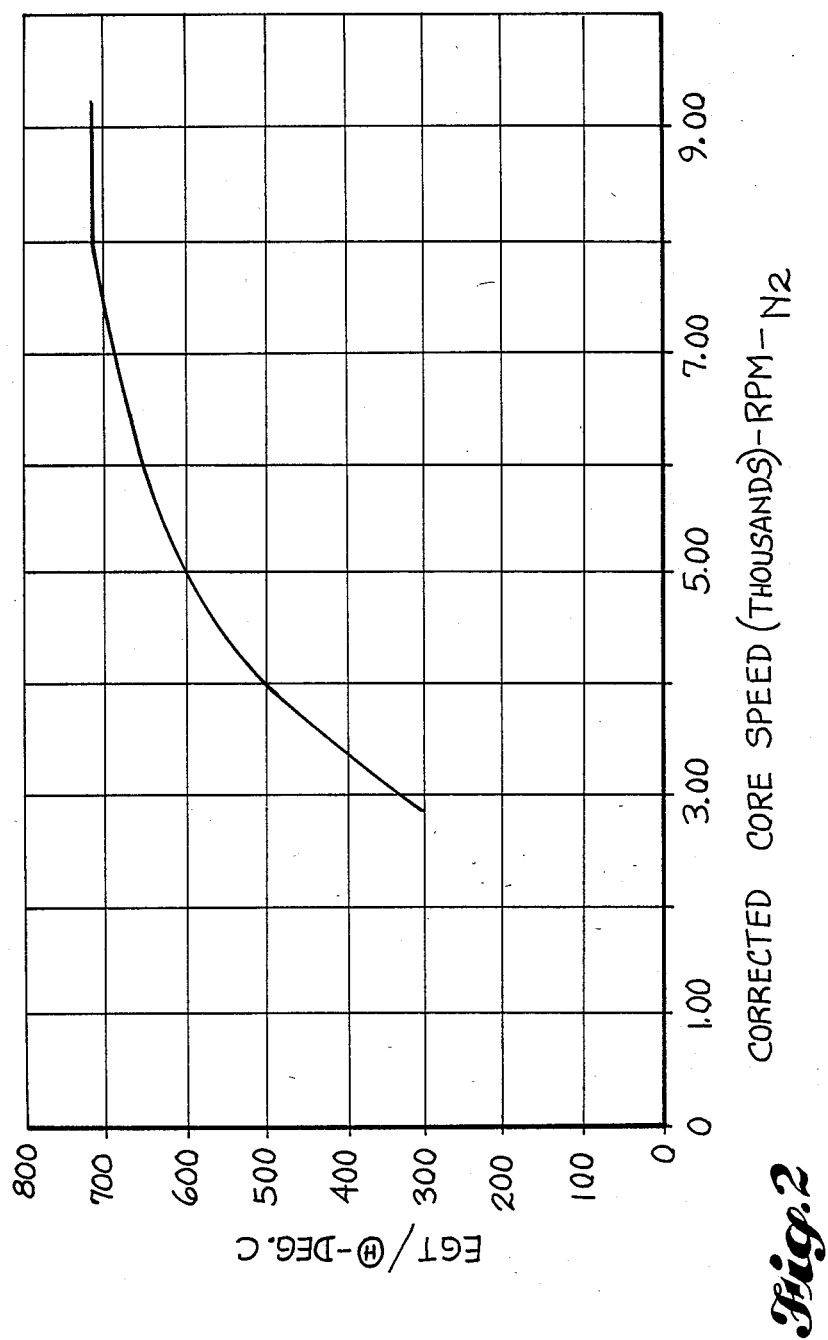
FIG. 2 is a graph showing EGT vs. N2.

The sliding EGT function compares the measured engine EGT with the limit value defined in the EGT VS N2 curve shown in FIG. 2. Variations in ambient air temperature are accounted for in the sliding EGT function through use of the TAT signal.

Determination of engine core rotor acceleration is accomplished in the filter logic of FIGS. 1A and 1B which employs a least squares linear curve fit based on discrete N2 values sampled over a known time interval.

Constants K1, K2, and K4 as used permit adjustments to the dN2/dt and sliding EGT function thresholds.

Detection of an abnormal engine condition activates a visual and/or audible warning device 100 in the flight deck alerting the flight crew that the engine should be promptly shutdown to prevent possible damage.

Figure 3:
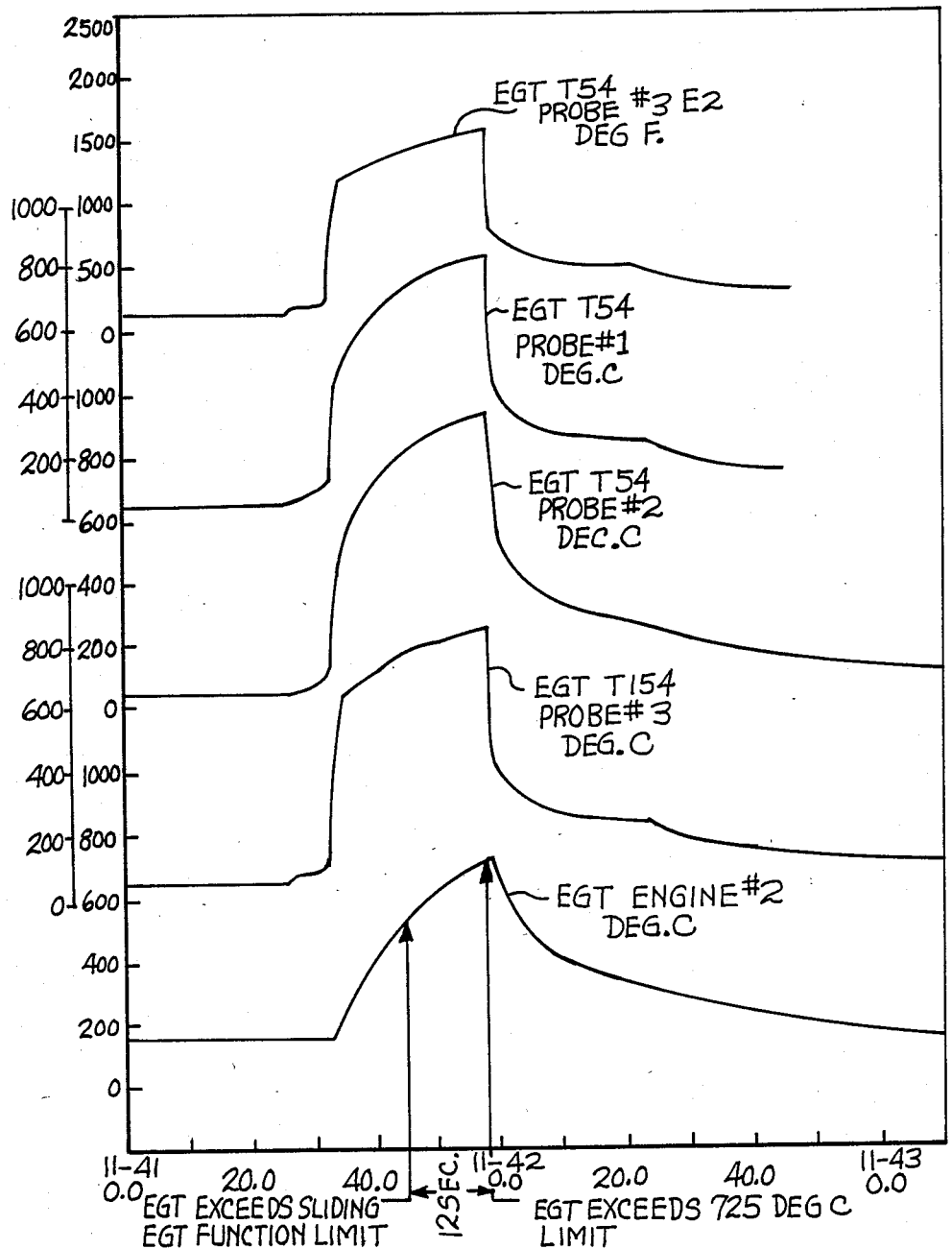
FIG. 3 is a time history plot representative of an abnormal engine condition (EGT > Sliding EGT function limit).

FIG. 3 shows a time history plot representative of an abnormal engine condition (EGT > Sliding EGT function limit). In this situation incorporation of the present ASAS system would have alerted the flight crew of the abnormal engine condition 12 seconds before the engine exceeded its EGT limit and was required to be shutdown.

What is claimed is:

1. A flight deck information system for providing a flight crew warning in the event of an abnormal engine operating condition in the sub-idle region comprising in combination:

first means for providing a signal representative of engine exhaust temperature;

second means for providing a signal representative of engine core rotor speed;

third means for providing a signal representative of total air temperature;

fourth means for providing a signal representative of engine fuel flow;

fifth means for providing a signal representative of calibrated airspeed;

a flight crew warning device; and, a signal processing circuit coupled to said first, second, third, fourth, and fifth means for providing a sub-idle abnormal engine condition signal to said flight crew warning device when all of conditions d. through f. are simultaneously satisfied with one or more of conditions a. through c.:

a. Engine EGT $\geq$ Sliding EGT function limit.
   b. Engine EGT $\geq$ 725° C.
   c. Engine core rotor acceleration $(dN2/dt) < 50$ RPM/SEC and N2 $\geq$ 4700 RPM.
   d. Engine fuel flow > 275 LBS/HR.
   e. Airframe calibrated airspeed < 60 Knots.
   f. Engine core rotor speed < 8000 RPM.

* * * * *